US008443113B2

(12) United States Patent
Ishii et al.

(10) Patent No.: US 8,443,113 B2
(45) Date of Patent: May 14, 2013

(54) COMMUNICATION APPARATUS

(75) Inventors: Shuichi Ishii, Tokyo (JP); Shinji Kunishige, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/456,193

(22) Filed: Apr. 25, 2012

(65) Prior Publication Data

US 2012/0206828 A1    Aug. 16, 2012

Related U.S. Application Data

(63) Continuation of application No. 13/021,743, filed on Feb. 5, 2011, now abandoned.

(30) Foreign Application Priority Data

Mar. 12, 2010 (JP) ................................ 2010-056756

(51) Int. Cl.
*G06F 3/00* (2006.01)
(52) U.S. Cl.
USPC .................. 710/5; 710/18; 710/36; 709/232; 709/237
(58) Field of Classification Search ........................ None
See application file for complete search history.

(56) References Cited

U.S. PATENT DOCUMENTS

| 7,650,540 | B2 * | 1/2010 | Chang et al. ................. 714/716 |
| 7,730,235 | B2 * | 6/2010 | Kumasawa et al. ............. 710/36 |
| 8,131,892 | B2 * | 3/2012 | Kumasawa et al. ............. 710/36 |
| 2003/0148801 | A1 * | 8/2003 | Deyring et al. ................ 455/701 |
| 2007/0223517 | A1 * | 9/2007 | Warren et al. .................. 370/463 |
| 2008/0126616 | A1 * | 5/2008 | Kumasawa et al. ............. 710/42 |
| 2009/0275291 | A1 * | 11/2009 | Myouga et al. ............. 455/67.14 |
| 2012/0191996 | A1 * | 7/2012 | Cheong .......................... 713/320 |

FOREIGN PATENT DOCUMENTS

| JP | 03-286324 | 12/1991 |
| JP | 06-334713 | 12/1994 |
| JP | 07-111504 | 4/1995 |
| JP | 11-004240 | 1/1999 |
| JP | 2007-233998 | 9/2007 |
| JP | 2009-037474 | 2/2009 |
| JP | 2009-271594 | 11/2009 |
| JP | 2010-003245 | 1/2010 |

OTHER PUBLICATIONS

SATA-IO, Serial ATA Revision 2.6, 2007, pp. 1-600.

* cited by examiner

*Primary Examiner* — Henry Tsai
*Assistant Examiner* — Michael Sun
(74) *Attorney, Agent, or Firm* — Patterson & Sheridan, LLP

(57) ABSTRACT

A communication apparatus is configured to execute testing of whether or not the responding module is correctly responding to the plurality of commands transmitted and received between a transmission module and a reception module, the testing being performed via a loop-back mode transmission and reception path configured such that the reception module receives the command transmitted by the transmission module; and during the testing, following procedure is performed, which includes: transmitting the specific command by the transmission module; receiving the specific command by the reception module via the transmission and reception path; deactivating reception of the specific command; and transmitting a command different from the specific command subsequent to transmitting the specific command by the transmission module.

5 Claims, 7 Drawing Sheets

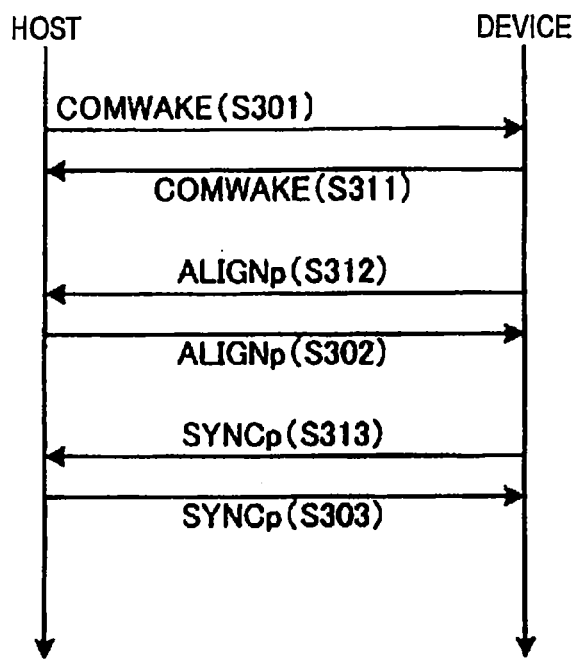
FIG. 3A  HOST ACTIVATION
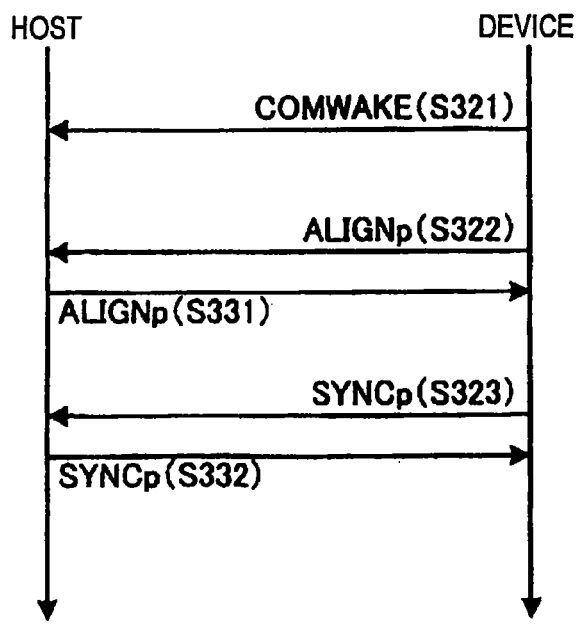
FIG. 3B  DEVICE ACTIVATION

US 8,443,113 B2

COMMUNICATION APPARATUS

CROSS-REFERENCE TO THE RELATED APPLICATION(S)

The present application is a continuation of U.S. patent application Ser. No. 13/021,743, filed Feb. 5, 2011, which is based upon and claims priority from prior Japanese Patent Application No. 2010-056756, filed on Mar. 12, 2010, the entire contents of which are incorporated herein by reference.

FIELD

Embodiments described herein relate to a communication apparatus and communication method for communicating with a counterpart device and capable of autonomously executing communication test.

BACKGROUND

Devices equipped with interface functionality based on a specific standard, as typified by SATA, are becoming increasingly prevalent. With the increase in interface enabled devices based on a specific standard, users of such devices are now able to simply switch over between various devices compatible with a particular interface according to the application.

However, until now, a testing device has been generally utilized to simulate a counterpart device during interface functional testing performed in the manufacturing processes for such devices. However, management of testing devices in the manufacturing process has become complicated, due to the need to update versions and switch over testing devices when there are updates in the version of the interface standard or changes to the protocol subject to testing. There is also a tremendous cost burden due to the limited period of use of testing devices.

There is consequently a demand for an interface functional test that can be easily performed.

For example, a simple method is disclosed in JP-A-2009-271594 (counterpart U.S. publication is: U.S. 2009/0275291 A1) for testing respective interfaces in a storage device having a reception interface and a transmission interface. Such testing is performed in a physically connected state, in which the transmission and reception interfaces are electrically connected to each other, such as with a cable. A command transmitted by the transmission interface is received by the reception interface, and autonomous testing is performed of the interfaces by detecting reception of the command in the storage device.

However, JP-A-2009-271594 proposes to perform interface testing utilizing a general command relating to transmission and reception of data, and excludes Out Of Band (OOB) sequence in a SATA standard. An OOB sequence is utilized for initializing a particular block that performs communication according to the SATA standard, or for switching the particular block to a power-save state or returning from a power-save state. The OOB sequence is a chain of a sequence of transmission and reception of a multiple signal exchange between a host side and a device side. However, in devices provided with SATA interface functionality, there is a high chance of problems occurring in the operation of the OOB sequence.

Namely, simple operational testing of OOB sequence in the SATA standard, simple operational testing relating to transmission and reception of multiple signals for switching the communication state expressing the state of communication of blocks that executes transmission and reception, could not be achieved.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

FIGS. 3A and 3B are sequence diagrams for explaining the operation of an OOB sequence, executed by each block provided to an HDC explained in FIG. 2, in order to return from a power-save state.

DETAILED DESCRIPTION

Figure 1:
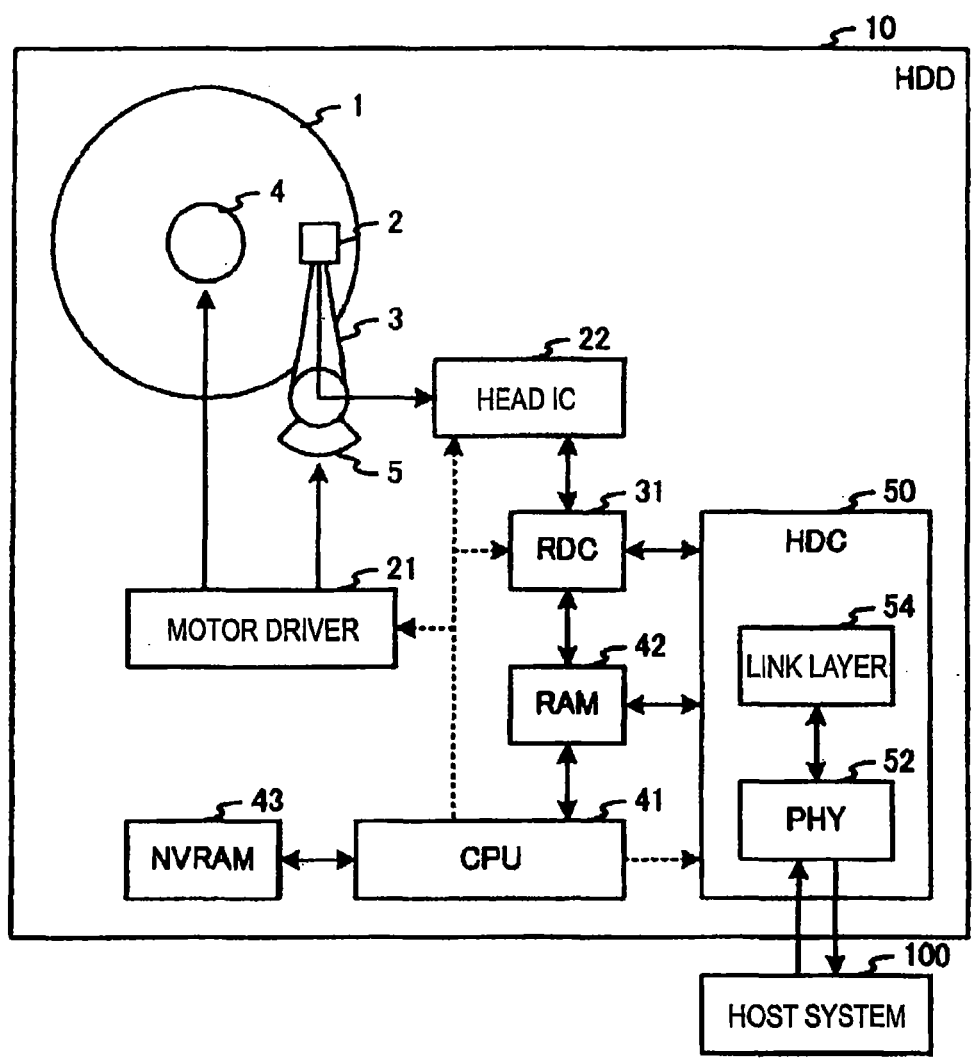
FIG. 1 is a block diagram showing a configuration of a magnetic disk device provided in a communication apparatus according to the present exemplary embodiment.

According to the embodiments described herein, there is provided a communication apparatus including: a transmission module configured to transmit a command; a reception module configured to receive the command; a responding module configured to respond so as to switch over a communication state of communication with the transmission module and the reception module from a first state, in which transmission and reception of the command is stopped, to a second state, in which transmission and reception of the command is routinely performed, when a plurality of the commands in a specific sequence are transmitted and received by the transmission module and the responding module; a testing module configured to execute testing of whether or not the responding module is correctly responding to the plurality of commands transmitted and received between the transmission module and the reception module, the testing being performed via a loop-back mode transmission and reception path configured such that the reception module receives the command transmitted by the transmission module; and a controller configured to control the transmission module and the reception module, during the testing being executed by the testing module, to operate in procedure including: transmitting the specific command by the transmission module; receiving the specific command by the reception module via the transmission and reception path; deactivating reception of the specific command; and transmitting a command different from the specific command subsequent to transmitting the specific command by the transmission module.

Embodiments according to the present invention will be described in detail with reference to the accompanying drawings. The scope of the claimed invention should not be limited to the examples illustrated in the drawings and those described in below.

FIG. 1 is a block diagram showing a configuration of a magnetic disk device (sometimes referred to below as an HDD) 10 provided to a communication apparatus according to an exemplary embodiment. The HDD 10 is an electronic device that communicates with a host system 100.

The HDD 10 according to the present exemplary embodiment has a mechanical structure including a magnetic disk 1, a magnetic head 2, an arm 3, a spindle motor 4, and a Voice Coil Motor (VCM) 5. The HDD 10 is provided with functional blocks of a circuit system including a motor driver 21, a head IC 22, a read-write channel IC (sometimes referred to below as an RDC) 31, a CPU 41, RAM 42, NVRAM 43, and a Hard Disk Controller (HDC) 50. The HDC 50 is configured by layered blocks, referred to as a Physical Layer (PHY) 52 and a Link Layer 54.

The HDD 10 according to the present exemplary embodiment communicates with the host system 100, which is external to the HDD 10, and executes specific processing according to such communication. There are plural defined communication states in a communication protocol with the host system 100, and transitioning (switching) between these plural communication states can be accomplished by a communication sequence of a specific order. These communication states represent states of communication by executing blocks of transmission and reception.

The magnetic disk 1 is fixed to the spindle motor 4 and is rotated by actuating the spindle motor 4. At least one face of the magnetic disk 1 is a recording face for undertaking magnetic recording.

The magnetic head 2 is provided at one end of the arm 3, so as to face the recording face of the magnetic disk 1. The magnetic head 2 reads out a signal magnetically recorded on the recording face of the magnetic disk 1 and outputs the read signal to the head IC 22. The magnetic head 2 also magnetically records on the recording face of the magnetic disk 1 according to a write-signal (write current) input from the head IC 22.

One end of the arm 3 is provided with the magnetic head 2. By actuating the VCM 5, the arm 3 swings about an axis at the opposite end to that provided with the magnetic head 2, such that the magnetic head 2 moves in a radial direction over the recording face of the magnetic disk 1.

The spindle motor 4 is actuated according to a drive signal input from the motor driver 21 and rotates the magnetic disk 1. The VCM 5 is actuated according to a drive signal input from the motor driver 21, swinging the arm 3.

Under control from the CPU 41, the motor driver 21 outputs drive signals for actuating the spindle motor 4 and the VCM 5 to the spindle motor 4 and the VCM 5, respectively.

The head IC 22 amplifies a signal input from the magnetic head 2, and outputs the amplified signal as read-data to the RDC 31. The head IC 22 outputs a write-signal (write current) to the magnetic head 2 according to recording data input from the RDC 31.

The RDC 31 performs specific processing on read-data input from the head IC 22, thereby decoding the data. The RDC 31 outputs the decoded data as transmission data to the HDC 50. The RDC 31 performs specific processing on the data to be recorded input from the HDC 50, encoding the data. The RDC 31 outputs the encoded data as recording data to the head IC 22. The RDC 31 utilizes the RAM 42 as working memory when performing the specific processing for coding and de-coding.

The CPU 41 controls each of the blocks provided in the HDD 10 according to a program stored in the NVRAM 43. The CPU 41 is a processor that performs specific processing according to data that the HDC 50 has received from the host system 100. The CPU 41 utilizes the RAM 42 as working memory when executing such a program.

The RAM 42 is working memory of the RDC 31, the CPU 41 and the HDC 50.

The NVRAM 43 is non-volatile memory for storing programs executed by the CPU 41. Programs stored on the NVRAM 43 are updatable.

The HDC 50 executes communication processing to send and receive data to and from the host system 100. The HDC 50 performs specific processing on transmitted data input from the RDC 31, encodes the data, and transmits the encoded data as transmission data to the host system 100. The HDC 50 performs specific processing on received data, received from the host system 100, decoding the data. The HDC 50 outputs the decoded data as data to be recorded to the RDC 31. The HDC 50 also outputs a particular signal internally generated in the HDC 50 to the host system 100, detects whether the particular signal has been input from the host system 100, and executes specific processing. The HDC 50 is capable of directly exchanging data with the RAM 42, without exchanging data with the RDC 31. A separate communication path for transmission and communication path for reception are provided between the HDC 50 and the host system 100. Under control from the CPU 41, the HDC 50 executes self-diagnostic processing relating to transmission and reception of data to and from the host system 100.

In the present exemplary embodiment, the HDC 50 executes communication processing with the host system 100 according to a Serial Advanced Technology Attachment (SATA) standard. The HDC 50 executes processing of a Built In Self Test (BIST), this being an autonomous diagnostic function of the SATA standard. In particular, the HDC 50 executes BIST processing in a loop-back mode. Namely, the HDC 50 functions as a communication apparatus according to the present exemplary embodiment.

The PHY 52, which is a layer block of the HDC 50, is a physical layer as defined by the SATA standard. The PHY 52 converts data input from the Link Layer 54 into a serial signal according to the SATA standard, and transmits the converted serial signal to the host system 100 via the transmission communication path. The PHY 52 performs specific processing according to the SATA standard on signals received from the host system 100 via the reception communication path, and outputs data obtained by such processing to the Link Layer 54.

The Link Layer 54 is one layer block from plural layer blocks as defined in the SATA standard. The Link Layer 54 performs specific processing on data input from the PHY 52, and outputs data obtained by such processing to a transport layer (not illustrated). The Link Layer 54 performs specific processing on the data input from the transport layer (not illustrated) and outputs data obtained by such processing to the PHY 52.

In the present exemplary embodiment, the Link Layer 54 executes processing to switch communication states for communication in the SATA standard, by a signal sequence of particular pattern exchanged with the host system 100 through the PHY 52. Specifically, the communication state of communication in the SATA standard adopts, a "PHYRDY" status, this being the normal communication state and a "PARTIAL or SLUMBER" status, which are power-save communication states. The status referred to as "PHYRDY" is a state in which steady transmission and reception of signals is performed. The statuses referred to as "PARTIAL or SLUMBER" are states in which transmission and reception of signals is halted. These plural communication states are mainly realized by switching over the operational state of the PHY 52.

In the present exemplary embodiment, an example is given in which a communication apparatus according to the present exemplary embodiment executes communication processing under the SATA standard, however there is no limitation thereto. The communication apparatus according to the present exemplary embodiment may, for example, apply any configuration in which a separate communication path for transmission and communication path for reception are provided.

In the present exemplary embodiment, the HDD 10 is given as an example of an electronic device applied with a configuration according to the embodiments described herein, however there is no limitation thereto. The configuration of the present exemplary embodiment may be an exemplary embodiment applied, for example, to an electronic device such as an optical disk/magneto-optical disk drive, a Solid State Drive (SSD), or the like.

By configuration thus, the plural blocks provided to the HDD 10 according to the present exemplary embodiment execute communication with the host system 100, external to the HDD 10, and execute specific processing according to data exchanged by such communication. According to the present exemplary embodiment, there are plural communication states defined for use in communication with the host system 100 under the SATA standard, these being "PHYRDY" and "PARTIAL or SLUMBER". Transition can be made between such plural communication states by use of a transmission and reception sequence between the HDD 10 and the host system 100 of a chain of plural signals. In the present exemplary embodiment, BIST processing is realizable under the SATA standard. Consequently, by use of the HDD 10 according to the present exemplary embodiment, an operational test can be performed relating to the transmission and reception of plural signals for transitioning between communication states. Such processing is mainly realized by the HDC 50 executing plural processes.

Figure 2:
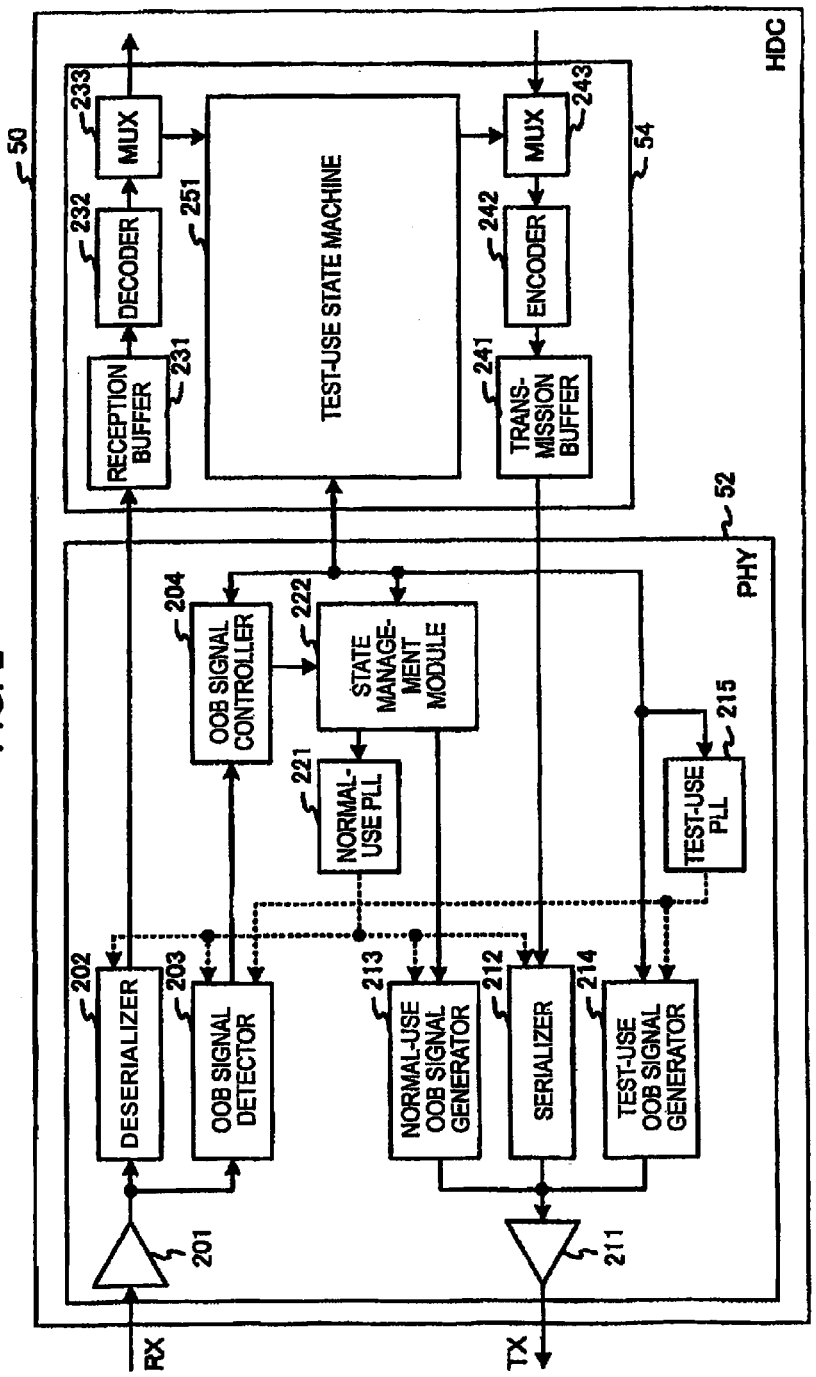
FIG. 2 is a configuration diagram of a system configured by each block provided to an HDC for executing communication processing with a host system according to a SATA standard.

Explanation follows, with reference to FIG. 2, of each block provided in the HDC 50 explained in FIG. 1 for executing communication processing with the host system 100 according to the SATA standard.

FIG. 2 is a configuration diagram of a system configured by each block provided to the HDC 50 for executing communication processing with the host system 100 according to the SATA standard.

The communication processing in the HDD 10 according to the present exemplary embodiment is executed, as stated above, by a configuration in which a separate communication path for transmission and communication path for reception are provided. The HDD 10 can be transitioned between the plural communication states, these being "PHYRDY" and "PARTIAL or SLUMBER", by use of a portion of the Out Of Band (OOB) sequence between the HDD 10 and the host system 100. The OOB sequence is employed to transit to a power-save state of a particular bloc performing communication according to the SATA standard, or to return from a power-save state. The communication states of "PARTIAL or SLUMBER" are power-save states. The OOB sequence is a transmission and reception sequence of a chain of plural signals exchanged between a host side and a device side according to the SATA standard. The HDD 10 according to the present exemplary embodiment is capable of testing the operation of the OOB sequence using a BIST loop-back mode. Such processing is executed mainly by the system configuration shown in the diagram of FIG. 2.

The HDC 50 is configured including the PHY 52 and the Link Layer 54.

The PHY 52 includes a reception AMP 201, a deserializer 202, an OOB signal detector 203, an OOB signal controller 204, a transmission AMP 211, a serializer 212, a normal-use OOB signal generator 213, a TEST-use OOB signal generator 214, a TEST-use PLL 215, a normal-use PLL 221, and a state management module 222.

The Link Layer 54 includes a reception buffer 231, a decoder 232, a MUX 233, a transmission buffer 241, an encoder 242, a MUX 243, and a TEST-use state machine 251.

The reception AMP 201 amplifies an RX signal according to the SATA standard received from outside of the HDC 50, and outputs the reception signal obtained by amplification to the deserializer 202 and the OOB signal detector 203. This RX signal indicates a reception signal.

The deserializer 202 extracts required data from the reception signal input from the reception AMP 201 and outputs the extracted data by specific unit to the reception buffer 231 of the Link Layer 54.

The OOB signal detector 203 detects whether or not the reception signal input from the reception AMP 201 is an OOB signal. An OOB signal is a signal using an OOB sequence to express commands of "COMRESET", "COMINT", and "COMWAKE". When the OOB signal detector 203 detects that the reception signal is an OOB signal, the OOB signal detector 203 outputs the detected OOB signal to the OOB signal controller 204.

The OOB signal controller 204 controls whether or not the OOB signal input from the OOB signal detector 203 is output to the state management module 222, under control from the TEST-use state machine 251 of the Link Layer 54. The OOB signal controller 204 autonomously outputs a particular OOB signal to the state management module 222, under control from the TEST-use state machine 251 of the Link Layer 54.

The transmission AMP 211 converts a signal input from the serializer 212, the normal-use OOB signal generator 213 or the TEST-use OOB signal generator 214 into a TX signal according to the SATA standard and transmits the signal out from the HDC 50. The TX signal indicates a transmission signal.

The serializer 212 attaches specific attachment data to plural units of data input by specific unit from the transmission buffer 241 of the Link Layer 54, serializes the data, and outputs the serialized data to the transmission AMP 211.

The normal-use OOB signal generator 213 generates an OOB signal under control from the state management module 222, and outputs the OOB signal to the transmission AMP 211.

In BIST processing, the TEST-use OOB signal generator 214 generates a specific OOB signal under control from the TEST-use state machine 251, and outputs the generated OOB signal to the transmission AMP 211. In the present exemplary embodiment, the TEST-use OOB signal generator 214 is controlled so as to operate when BIST processing is executed.

The TEST-use PLL 215 generates a clock signal employed as a standard clock for operation of the TEST-use OOB signal generator 214 and the OOB signal detector 203. The TEST-use PLL 215 supplies the generated clock signal to the TEST-use OOB signal generator 214 and the OOB signal detector 203. The TEST-use PLL 215 operates, or ceases operation, under control from the TEST-use state machine 251. The TEST-use PLL 215 of the present exemplary embodiment is controlled so as to operate when BIST processing is executed.

The normal-use PLL 221 generates a clock signal employed as a standard clock for operating plural blocks, including the deserializer 202, the OOB signal detector 203, the serializer 212, and the normal-use OOB signal generator 213. The normal-use PLL 221 supplies the generated clock signal to each of the corresponding respective blocks. The normal-use PLL 221 operates, or ceases operation, under control from the state management module 222. The normal-use PLL 221 in the present exemplary embodiment is controlled so as to operate when the communication state is "PHYRDY" or "PARTIAL", and to cease operation when the communication state is "SLUMBER".

The state management module 222 controls the operational state of the PHY 52 under control from the TEST-use state machine 251. The state management module 222 controls such that, for example, at least the normal-use PLL 221 and the normal-use OOB signal generator 213 cease operation when the operational state of the PHY 52 is controlled to that corresponding to "SLUMBER" communication state. The state management module 222 outputs the OOB signal input from the OOB signal controller 204 to the TEST-use state machine 251.

The reception buffer 231 stacks data input by specific unit from the deserializer 202. The reception buffer 231 then outputs the stacked data in sequence to the decoder 232 using a FIFO method.

The decoder 232 decodes the data sequentially input from the reception buffer 231. The decoder 232 in the present exemplary embodiment functions according to the SATA standard as a block including a 10B/8B decoder and descrambler. The decoder 232 outputs decoded data to the MUX 233.

The MUX 233 outputs the data input from the decoder 232 to the transport layer (not illustrated) or to the TEST-use state machine 251. The block to which the MUX 233 is to output is controlled by the TEST-use state machine 251 or by a state machine (not illustrated) used in normal operation.

The transmission buffer 241 stacks data input by specific unit from the encoder 242. The transmission buffer 241 then outputs the stacked data sequentially to the serializer 212 using a FIFO method.

The encoder 242 encodes the data input from the MUX 243. The encoder 242 in the present exemplary embodiment functions according to the SATA standard as a block including an 8B/10B encoder and scrambler. The encoder 242 outputs the encoded data to the transmission buffer 241.

The MUX 243 outputs the data input from the transport layer (not illustrated), or from the TEST-use state machine 251, to the encoder 242. The block from which the MUX 243 is input is controlled by the TEST-use state machine 251, of by a state machine (not illustrated) used in normal operation.

The TEST-use state machine 251 is an operation circuit for executing BIST processing according to operation of the OOB sequence, in which a transmission and reception sequence of a chain of plural signals, and a control sequence for the PHY 52, are defined. The TEST-use state machine 251 outputs data for response to the data input from the MUX 233 to the MUX 243 according to a specific transmission and reception sequence. The TEST-use state machine 251 controls the operational state of the PHY 52 by outputting specific data to the state management module 222. The TEST-use state machine 251 aligns to the control of the operational state of the PHY 52, and outputs data for controlling each block to the OOB signal controller 204, the TEST-use OOB signal generator 214 and the TEST-use PLL 215, respectively. The TEST-use state machine 251 also, according to the OOB signal input from the state management module 222, outputs data for controlling the operational state of the PHY 52 to the state management module 222. The TEST-use state machine 251 outputs data for response to the MUX 243, according to the particular OOB signal input from the state management module 222.

Note that an exemplary embodiment may be configured without the OOB signal controller 204, with the processing that would have been executed by the OOB signal controller 204 executed by the OOB signal detector 203, the state management module 222, or the TEST-use state machine 251.

By system configuration with these plural blocks, the HDC 50 can test by BIST the operation of the OOB sequence under the SATA standard. Such BIST processing of the operation of the OOB sequence is mainly realized by the TEST-use state machine 251 provided to the Link Layer 54 controlling the operational state of the PHY 52. Consequently, in the HDD 10 according to the present exemplary embodiment, operational tests can be performed relating to the transmission and reception of plural signals for transitioning the communication state.

Explanation follows, with reference to FIG. 3A and FIG. 3B, of operation of the OOB sequence executed by each of the blocks provided to the HDC 50 explained in FIG. 2 in order to return from a power-save state.

FIG. 3A and FIG. 3B are sequence diagrams for explaining the operation of OOB sequence executed by each of the blocks provided to the HDC 50 explained in FIG. 2 in order to return from a power-save state.

In the SATA standard, the OOB sequence for returning from a power-save state is defined by a transmission and reception sequence of a chain of plural signals exchanged between host and device. In the OOB sequence as described above, signals expressing commands called "COMRESET", "COMINT" and "COMWAKE" are used. Activation of the OOB sequence for returning from a power-save state is defined in two start-up protocols, these being host activation and device activation.

Connection is established between the host and the device such that a TX signal from the host is an RX signal to the device, and such that an RX signal to the host is a TX signal from the device. In the explanation that follows, paths or terminals for transmitting a TX signal from the host and from the device are annotated TX, and paths or terminals for transmitting an RX signal from the host and from the device are annotated RX. A signal transmitted from TX of the host is received as RX of the device, and a signal transmitted from TX of the device is received as RX of the host.

When a signal based on the OOB sequence explained above is transmitted or received, the HDC 50 responds such that the communication state of the HDC 50 itself switches from "PHYRDY" to "PARTIAL or SLUMBER".

Activation of the host shown in FIG. 3A is initiated when the communication state of both the host and the device is a power-save state.

First, a signal expressing "COMWAKE" is transmitted from the host to the device (S301). Then a signal expressing "COMWAKE" is transmitted to the host from the device that received "COMWAKE" from the host. The "COMWAKE" transmitted from the host and the "COMWAKE" transmitted from the device are signals that are the same as each other. By thus transmitting and receiving "COMWAKE" in both directions, the device and the host are returned from a power-save state.

After a specific period has elapsed since transmission of the "COMWAKE" (S302), the device transmits a signal expressing "ALIGNp" to the host (312). "ALIGNp" here represents "ALIGN" primitive. A primitive is an essential element of a communication protocol in the SATA standard. The host, on receipt of the "ALIGNp" from the device, transmits a signal expressing "ALIGNp" to the device (S302).

This is followed by transmission of a signal expressing "SYNCp" from the device to the host (S313), and transmission of a signal expressing "SYNCp" from the host to the device (S303). "SYNCp" here represents a "SYNC" primitive.

After two-way transmission and reception of the "ALIGNp" and the specific between the host and the device in this manner, transmission and reception of data can be made in the normal state between the host and the device.

Device activation shown in FIG. 3B is also initiated when the communication state of both the host and the device is a power-save state.

In device activation, a signal expressing "COMWAKE" is first transmitted from the device to the host (S321). The host and the device are both returned from a power-save state by the transmission and reception of "COMWAKE" from the device to the host.

Then, in a similar manner to host activation, a signal expressing "ALIGNp" is transmitted from the device to the host (S322), and a signal expressing "ALIGNp" is transmitted from the host to the device (S331). A signal expressing "SYNCp" is also transmitted from the device to the host (S323), and a signal expressing "SYNCp" is transmitted from the host to the device (S332).

After two-way transmission and reception of "ALIGNp" and "SYNCp" between the host and the device, transmission and reception of data can be made in the normal state between the host and the device.

In this manner, plural signals are exchanged based on the OOB sequence in a state in which the host and the device are connected together with communication enabled. The HDD 10 according to the present exemplary embodiment can be returned from "PARTIAL or SLUMBER", these being power-save states, to "PHYRDY".

Figure 4:
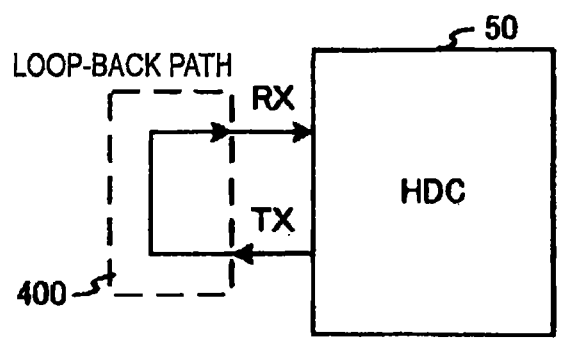
FIG. 4 is an outline diagram for explaining the operation of BIST processing executed by an HDC provided to an HDD according to the present exemplary embodiment.

Explanation follows, with reference to FIG. 4, of operation of BIST processing executed by the HDC 50 provided to the HDD 10 according to the present exemplary embodiment.

FIG. 4 is an outline diagram for explaining the operation of BIST processing executed by the HDC 50 provided to the HDD 10 according to the present exemplary embodiment.

The communication path used for transmission of the HDC 50, TX, and the communication path used for transmission, RX, are connected as a loop-back path 400, which is a communication path for loop-back mode. By connecting the TX and the RX in this manner, the signal output from the TX is received by the RX through the loop-back path 400.

Namely, BIST processing by the HDC 50 provided to the HDD 10 of the present exemplary embodiment is executed in a mode in which the TX and the RX are connected together. When signal transmission and reception is performed based on the OOB sequence, this BIST processing tests whether or not the HDC 50 responds such that the communication state of the HDC 50 itself can correctly be switched. In other words, by the BIST processing the HDC 50 is able to perform self-diagnostics on its response relating to OOB sequence.

In the outline diagram shown in FIG. 4, an exemplary embodiment is shown of the loop-back path 400 with the TX and the RX connected together outside of the HDC 50, however exemplary embodiment may be adopted with a loop-back path 400 in which the TX and the RX are connected together within the HDC 50.

In the loop-back connected state the HDC 50 according to the present exemplary embodiment executes BIST processing in order to test the operation of the OOB sequence explained below.

Figure 5:
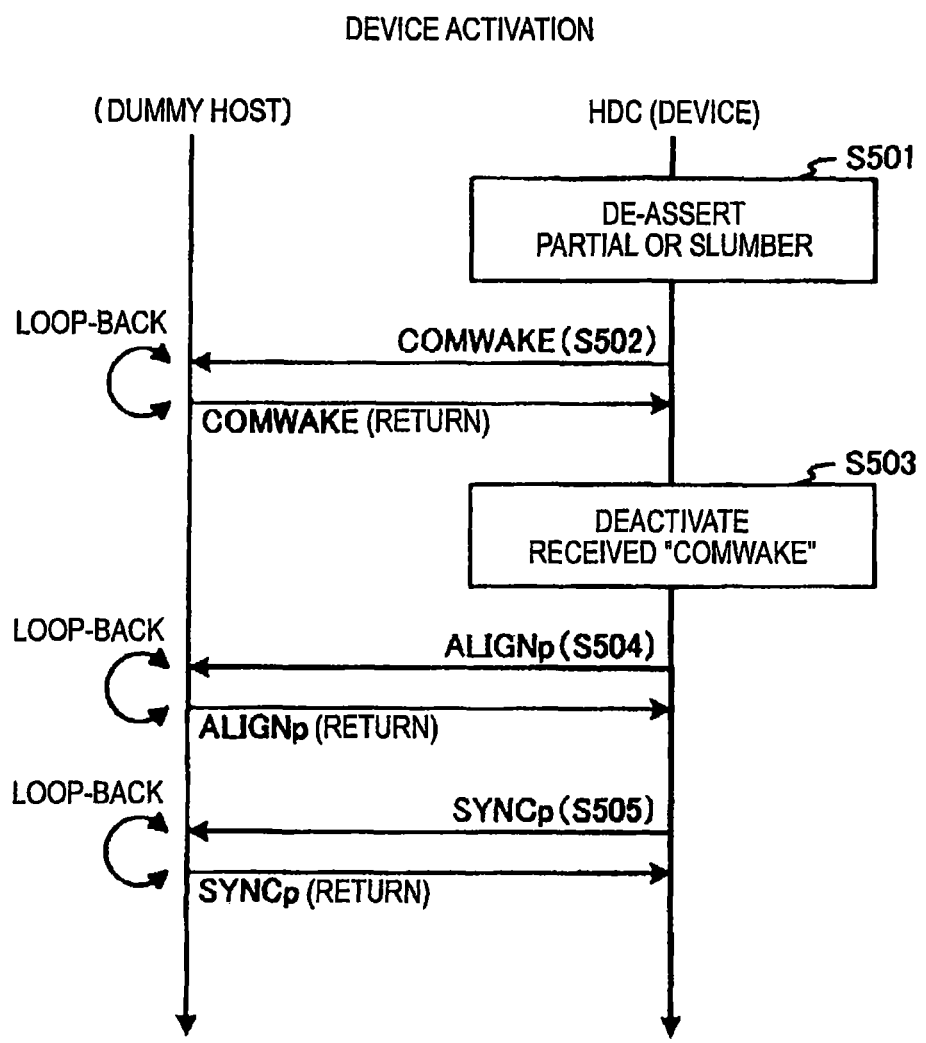
FIG. 5 is a sequence diagram for explaining BIST processing executed by an HDC for testing operation of an OOB sequence in device activation for returning from a power-save state.

Explanation follows, with reference to FIG. 5, of BIST processing executed by the HDC 50 for testing operation of the OOB sequence in device activation for returning from a power-save state.

FIG. 5 is a sequence diagram for explaining the BIST processing executed by the HDC 50 for testing operation of the OOB sequence in device activation for returning from a power-save state.

In this BIST processing, the HDC 50 operates as the device. As shown in FIG. 4, in order for the TX of the HDC 50 to transmit a signal through the loop-back path 400 as an RX of the HDC 50 itself, a dummy host is considered to be present, even though no host is actually present. Namely, in the BIST processing for testing the operation of the OOB sequence in device activation in the present exemplary embodiment, the HDC 50, which is the device, communicates with the dummy host, so as to test operation of returning from a power-save state initiated by the HDC 50.

Namely, in a mode in which the TX and the RX of the HDC 50 are connected together, the HDC 50 initiates BIST processing by performing a specific procedure. The communication state when this occurs is either "PARTIAL" or "SLUMBER", these being power-save states. A particular block of the Link Layer 54 controls the PHY 52 such that the operation state corresponding to "PARTIAL" or "SLUMBER" is adopted. This control is executable by asserting to the state management module 222 a dedicated control signal corresponding to "PARTIAL" or "SLUMBER".

When this BIST processing is initiated, first the TEST-use state machine 251 of the Link Layer 54 de-asserts the control signal for making the operational state of the PHY 52 correspond to "PARTIAL" or "SLUMBER" (S501). When a control signal corresponding to "PARTIAL" is de-asserted to the state management module 222, control is made such that the normal-use OOB signal generator 213 is operated. When a control signal corresponding to "SLUMBER" is de-asserted to the state management module 222, control is made such that the normal-use OOB signal generator 213 and the normal-use PLL 221 are operated. The PHY 52 can thereby be switched from an operational state corresponding to "PARTIAL" or "SLUMBER" to the operational state corresponding to "PHYRDY".

A signal expressing "COMWAKE" generated by the normal-use OOB signal generator 213, under control from the state management module 222, is then transmitted as a TX signal from the TX, through the transmission AMP 211, to the dummy host (S502). "COMWAKE" is received by RX as an RX signal through the loop-back path 400.

When the RX of the device receives "COMWAKE" during normal operation, the device then transmits "COMWAKE" to the host, similarly to the OOB sequence in host activation shown in FIG. 3A. However, in the BIST processing in the present exemplary embodiment, the "COMWAKE" received as RX is processed so at to be deactivated (S503).

Specifically, the following operations are executed. First, the OOB signal detector 203 detects the "COMWAKE" received through the reception AMP 201. Then the OOB signal detector 203 outputs the detected "COMWAKE" to the OOB signal controller 204. The OOB signal controller 204, under control from the TEST-use state machine 251, operates such that the input OOB signal is not output to the state management module 222. Namely, the OOB signal controller 204 de-activates the "COMWAKE" received as an RX signal.

In this manner, repeated transmission and reception of the "COMWAKE" is avoided in the BIST processing.

After a specific period has elapsed from when a control signal corresponding to "PARTIAL" or "SLUMBER" has been de-asserted to the PHY 52, the TEST-use state machine 251 outputs a signal expressing "ALIGNp" to the MUX 243. The "ALIGNp" is input to the serializer 212 via the MUX 243, the encoder 242, and the transmission buffer 241. The "ALIGNp" is also transmitted to the dummy host from the TX as a TX signal, via the serializer 212 and the transmission AMP 211 (S504).

The "ALIGNp" is then received by the RX as an RX signal via the loop-back path 400. The received signal expressing "ALIGNp" is input to the reception buffer 231 via the reception AMP 201 and the deserializer 202. The "ALIGNp" is also input to the TEST-use state machine 251 via the transmission buffer 231, the decoder 232 and the MUX 233. The TEST-use state machine 251 executes successive specific processing according to the input of the "ALIGNp". The HDC 50, serving as the device, can thereby be operated as if transmission and reception had been performed of the "ALIGNp" with the dummy host.

After a specific period has elapsed from input of the "ALIGNp" from the dummy host, the TEST-use state machine 251 outputs a signal expressing "SYNCp" to the MUX 243. The "SYNCp" here, is transmitted to the dummy host (S505) in a similar manner to the "ALIGNp" described above. The "SYNCp" is received by the RX as a signal transmitted from the dummy host, and processed by the TEST-use state machine 251. The HDC 50 serving as the device can then operate as if transmission and reception of "SYNCp" with the dummy host had followed "ALIGNp".

Namely, in the BIST processing for testing operation of the OOB sequence in device activation, after transmission of "COMWAKE", "COMWAKE" reception deactivation is executed at the timing of transmission of the "ALIGNp" different from the "COMWAKE". In other words, the BIST processing is executed by transmitting "ALIGNp", which is different from "COMWAKE" that should be transmitted in response to received "COMWAKE", once between commencing processing and finishing processing.

By thus deactivating the particular primitive received from the dummy host, the HDC 50 can thereby transmit and receive successive primitives in a specific sequence. Since the HDC 50 receives the transmitted primitive via the loop-back path 400, a chain of actions can be executed, these being transmission of the primitive to the dummy host and reception of the primitive from the dummy host. Consequently, the HDC 50 according to the present exemplary embodiment can easily perform operational testing relating to transmission and reception of plural signals for switching communication states.

Figure 6:
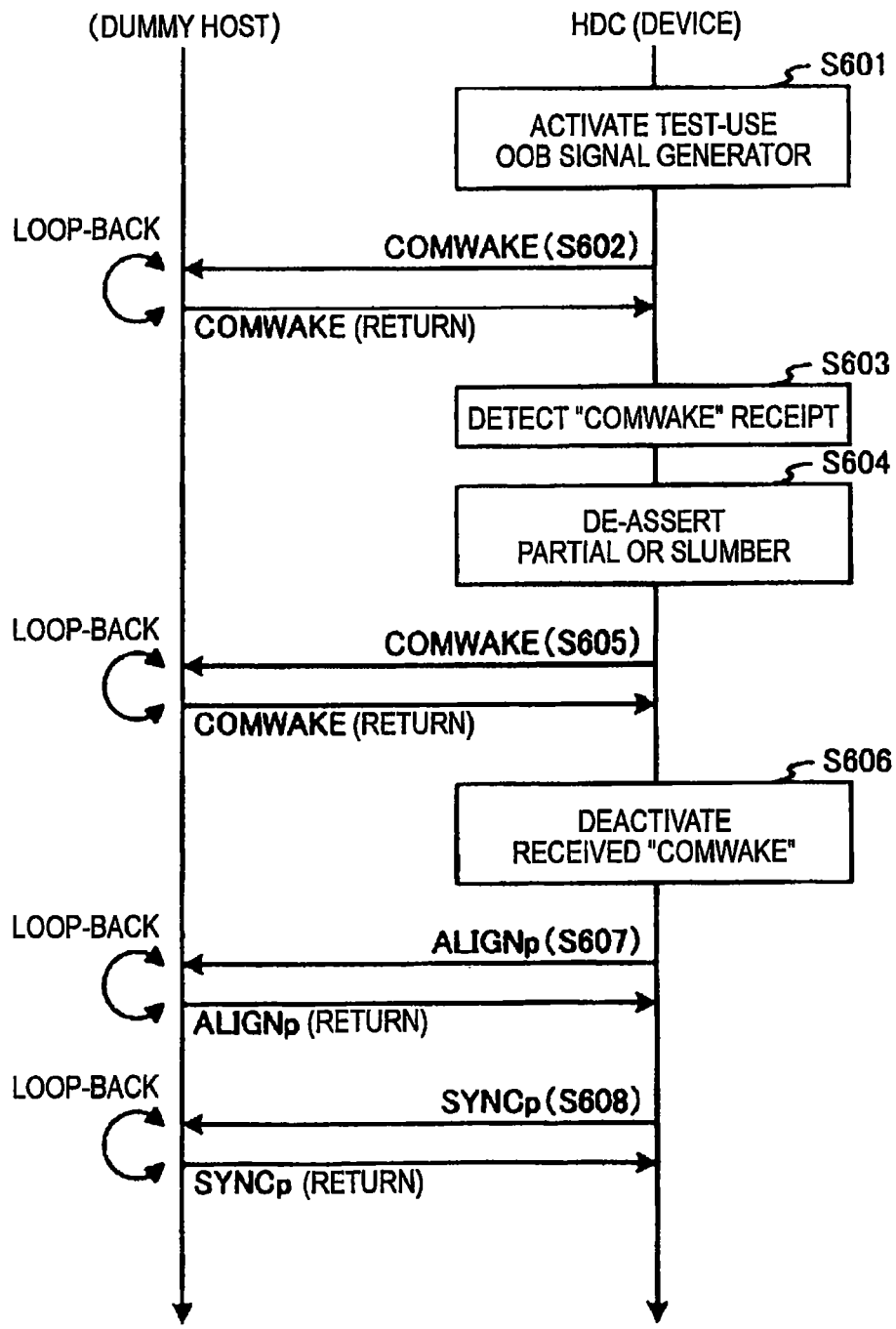
FIG. 6 is a sequence diagram for explaining a First Example of BIST processing executed by a HDC for testing operation of an OOB sequence in host activation for returning from a power-save state.

Explanation follows, with reference to FIG. 6, of BIST processing executed by the HDC 50 for testing operation of OOB sequence for returning from a power-save state in host activation.

FIG. 6 is a sequence diagram for explaining a First Example of BIST processing executed by the HDC 50 for testing operation of OOB sequence for returning from a power-save state in host activation.

In the First Example of BIST processing, the HDC 50 is operated as the device. As shown in FIG. 4, the TX of the HDC 50 is for transmitting a signal to the RX of the HDC 50 itself via the loop-back path 400, a dummy host is considered to be present, even though no host is actually present. In the First Example of BIST processing for testing the operation of the OOB sequence in host activation in the present exemplary embodiment, the HDC 50, which is the device, communicates with the dummy host, so as to test operation of returning from a power-save state as initiated by the dummy host.

The HDC 50 initiates BIST processing by a specific procedure in a state in which the TX and the RX of the HDC 50 are connected together. The communication state when this occurs is "PARTIAL" or "SLUMBER", which are power-save states. The PHY 52 is controlled such that a particular block of the Link Layer 54 adopts the operational state corresponding to "PARTIAL" or "SLUMBER".

When the BIST processing is initiated, first, with the PHY 52 still in an operational state corresponding to "PARTIAL" or the "SLUMBER", the TEST-use state machine 251 of the Link Layer 54 activates the TEST-use OOB signal generator 214 and the TEST-use PLL 215 (S601). When the PHY 52 is in the operational state corresponding to "SLUMBER", activation of the TEST-use PLL 215 is required since the normal-use PLL 221 is stopped. However, when the PHY 52 is in the operational state corresponding to "PARTIAL", activation of the TEST-use PLL 215 is not required, as long as the TEST-use OOB signal generator 214 is able to receive a clock signal from the normal-use PLL 221.

The activated TEST-use OOB signal generator 214 generates a signal expressing "COMWAKE". The generated signal expressing "COMWAKE" is transmitted as a TX signal from the TX via the transmission AMP 211 to the dummy host (S602). The "COMWAKE" here is received as an RX signal by the RX via the loop-back path 400. The "COMWAKE" received by the reception AMP 201 is detected by the OOB signal detector 203 as a "COMWAKE" transmitted from the dummy host (S603). Namely, the OOB sequence in host activation is initiated by detection of "COMWAKE" transmitted from the dummy host as the leading command of the OOB sequence.

The "COMWAKE" detected by the OOB signal detector 203 is output to the OOB signal controller 204. When this occurs, the OOB signal controller 204 operates, under control from the TEST-use state machine 251, so as to output the input OOB signal to the state management module 222. Namely, the OOB signal controller 204 outputs the input "COMWAKE" to the state management module 222.

The state management module 222 outputs a control signal, expressing that the "COMWAKE" input from the OOB signal controller 204 has been detected, to the TEST-use state machine 251. The TEST-use state machine 251 de-asserts a control signal for making the operational state of the PHY 52 that corresponding to "PARTIAL" or "SLUMBER" (S604). The PHY 52 can thereby be switched from an operational state of "PARTIAL" or the "SLUMBER" to the operational state of "PHYRDY". Subsequent operations are similar to the BIST processing for testing OOB sequence in device activation, as shown in FIG. 5.

Namely, the "COMWAKE" generated by the normal-use OOB signal generator 213 is transmitted from the transmission AMP 211 to the dummy host as a response from the device (S605). This "COMWAKE" is received by the reception AMP 201 via the loop-back path 400, however it is deactivated by the OOB signal controller 204 (S606). Namely, at this timing the OOB signal controller 204, by control from the TEST-use state machine 251, operates so as not to output the input OOB signal to the state management module 222. In this BIST processing too, repetition of transmission and reception of the "COMWAKE" is avoided in this manner.

After a specific period has elapsed, the TEST-use state machine 251 outputs a signal expressing "ALIGNp" to the MUX 243. The "ALIGNp" here is transmitted from the transmission AMP 211 to the dummy host (S607). The transmitted "ALIGNp" returns to the reception AMP 201 through the loop-back path 400, and is input to the TEST-use state machine 251.

After a specific period has elapsed, the TEST-use state machine 251 outputs a signal expressing "SYNCp" to the MUX 243. The "SYNCp" here is transmitted from the transmission AMP 211X to the dummy host (S608). The transmitted "SYNCp" returns to the reception AMP 201 via the loop-back path 400, and is input to the TEST-use state machine 251.

In the First Example of BIST processing for testing the operation of the OOB sequence in host activation, the "COMWAKE" is transmitted two times between commencing processing and finishing processing, then the "ALIGNp", this being a primitive for continuation, is transmitted. Namely, in the First Example of BIST processing for testing the operation of the OOB sequence in host activation, after transmitting "COMWAKE", reception of the "COMWAKE" is deactivated at the timing of transmitting "ALIGNp" different from "COMWAKE". In other words, the BIST processing is executed by transmitting "ALIGNp", which is different from "COMWAKE" that should be transmitted in response to received "COMWAKE", once between commencing processing and finishing processing.

In this manner, the HDC can initiate the OOB sequence for host activation by the HDC 50 receiving, as a primitive transmitted from the dummy host, the primitive that was transmitted by the HDC 50 itself. By deactivating at a specific timing a specific primitive received from the dummy host, the primitive for continuation can be transmitted and received in a specific sequence. Since the HDC 50 also receives the transmitted primitive via the loop-back path 400, a chain of operations can be executed, these being transmission of the primitive to the dummy host and reception of the primitive from the dummy host. Consequently, the HDC 50 according to the present exemplary embodiment can easily perform operational testing relating to transmission and reception of plural signals for switching communication states.

Figure 7:
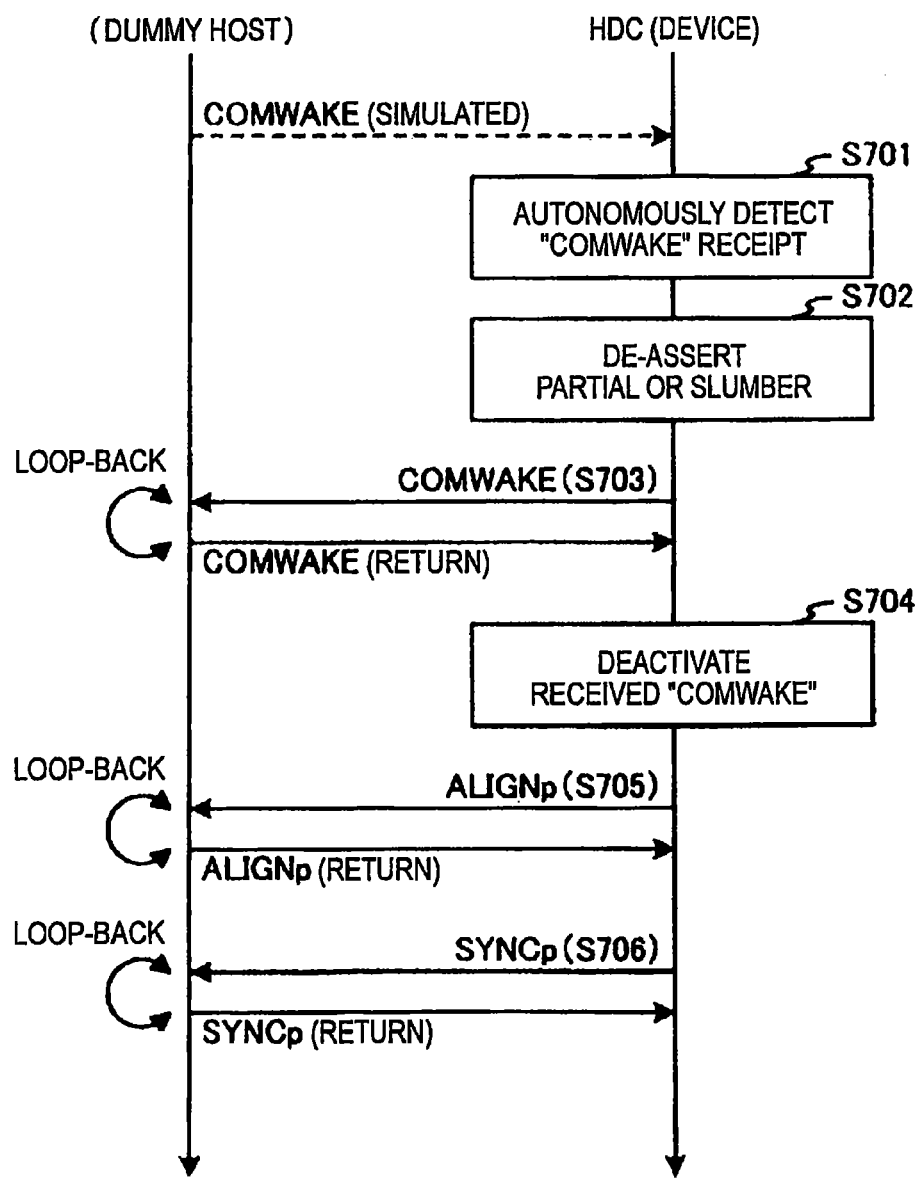
FIG. 7 is a sequence diagram for explaining a Second Example of BIST processing executed by a HDC for testing operation of an OOB sequence in host activation for returning from a power-save state.

Explanation follows, with reference to FIG. 7, of BIST to processing executed by the HDC 50, for testing operation of OOB sequence for returning from a power-save state in host activation.

FIG. 7 is a sequence diagram for explaining a Second Example of BIST processing executed by the HDC 50 for testing operation of OOB sequence for returning from a power-save state in host activation.

In the Second Example of BIST processing in host activation too, the HDC 50 operates as the device. As shown in FIG. 4, the TX and the RX of the HDC 50 are connected together via the loop-back path 400. Namely, in the Second Example of BIST processing in host activation too, the HDC 50, which is the device, communicates with a dummy host, so as to test operation of returning from a power-save state as initiated by the dummy host. The Second Example of BIST processing in host activation is performed in substantially the same manner as the First Example of BIST processing in host activation described above, however it differs in the operation initiating the BIST processing.

The HDC 50 initiates BIST processing by a specific procedure in a state in which the TX and the RX of the HDC 50 are connected together. The communication state when this occurs is "PARTIAL" or "SLUMBER". The PHY 52 is controlled such that a particular block of the Link Layer 54 adopts the operational state corresponding to "PARTIAL" or the "SLUMBER".

When the BIST processing is initiated, first, with the PHY 52 still in the operational state corresponding to "PARTIAL" or "SLUMBER", the TEST-use state machine 251 of the Link Layer 54 controls the OOB signal controller 204. The OOB signal controller 204, by control from the TEST-use state machine 251, autonomously outputs to the state management module 222 a signal expressing that "COMWAKE" has been detected (S701). Namely, the state management module 222 is input from the OOB signal controller 204 with a control signal expressing that "COMWAKE" has been detected. The OOB sequence in host activation is initiated by detecting the "COMWAKE" transmitted from the host as the leading command of the OOB sequence.

The state management module 222 outputs the control signal expressing that "COMWAKE" has been detected as input from the OOB signal controller 204 to the TEST-use state machine 251. The TEST-use state machine 251 de-asserts the control signal for making the PHY 52 adopt an operational state corresponding to "PARTIAL" or "SLUMBER" (S702). The PHY 52 can thereby be switched from an operational state corresponding to "PARTIAL" or the "SLUMBER" to the operational state corresponding to "PHYRDY". Subsequent operations are similar to those of the BIST processing for testing OOB sequence in device activation shown in FIG. 5.

Namely, "COMWAKE" generated by the normal-use OOB signal generator 213 as a response from the device is transmitted from the transmission AMP 211 to the dummy host (S703). This "COMWAKE" is received by the reception AMP 201 via the loop-back path 400, however it is deactivated by the OOB signal controller 204 (S704). Namely, at this timing the OOB signal controller 204, by control from the TEST-use state machine 251, operates so as not to output the input OOB signal to the state management module 222. Thus, this BIST processing also avoids repeated transmission and reception of the "COMWAKE".

After a specific period has elapsed, the TEST-use state machine 251 outputs to the MUX 243 a signal expressing "ALIGNp". The "ALIGNp" here is transmitted from the transmission AMP 211 to the dummy host (S705). The transmitted "ALIGNp" returns to the reception AMP 201 via the loop-back path 400, and is input to the TEST-use state machine 251.

After a specific period has elapsed, the TEST-use state machine 251 outputs to the MUX 243 a signal expressing "SYNCp". The "SYNCp" here is transmitted from the transmission AMP 211X to the dummy host (S706). The transmitted "SYNCp" returns to the reception AMP 201 via the loop-back path 400, and is input to the TEST-use state machine 251.

Note that while explanation has been given of an exemplary embodiment in which the initiation point for the BIST processing is the OOB signal controller 204 autonomously outputting to the state management module 222 a signal expressing that "COMWAKE" has been received, other embodiments may be used. For example, configuration may be made in which the OOB signal detector 203 autonomously outputs to the OOB signal controller 204 a signal expressing that the "COMWAKE" has been detected. A configuration may also be made in which input is simulated of a signal expressing that the state management module 222 or the TEST-use state machine 251 has detected "COMWAKE". The Second Example of the BIST processing in host activation can be realized in any of these configurations, however preferably a block provided to the PHY 52 is used as the initiation point.

In the Second Example of BIST processing for testing the operation of the OOB sequence in host activation, in succession after transmitting "COMWAKE", reception of "COMWAKE" is deactivated at the timing of transmitting the "ALIGNp" differing from the "COMWAKE". In other words, the BIST processing is executed by transmitting "ALIGNp", which is different from "COMWAKE" that should be transmitted in response to received "COMWAKE", once between commencing processing and finishing processing.

The HDC 50 can thereby initiate OOB sequence in host activation as a primitive transmitted from a dummy host. By deactivating at a specific timing a specific primitive received from the dummy host, the primitive for continuation can be transmitted and received in a specific sequence. Since the HDC 50 also receives the transmitted primitive via the loop-back path 400, a chain of operations can be executed, these being transmission of the primitive to the dummy host and reception of the primitive from the dummy host. Consequently, the HDC 50 according to the present exemplary embodiment can easily perform operational testing relating to transmission and reception of plural signals for switching communication states.

According to the present exemplary embodiment as described above, the TX and the RX of the HDC 50 can be easily connected together. Execution of subsequent operations is enabled by connection in this manner. For example, transmission and reception in a specific sequence of primitives for continuation is possible by a block for deactivating a received specific OOB signal at a specific timing. It is also possible to execute a chain of operations of primitive transmission and reception with a dummy host, using a block for transmission and reception of signals in the same sequence as that of normal operation. In addition, it is possible to easily initiate the OOB sequence by using a block for simulating detection of reception of a particular primitive from a dummy host, or a block for transmitting a particular primitive. Consequently, the HDC 50 according to the present exemplary embodiment can easily perform operational testing relating to transmission and reception of plural signals for switching communication states.

Although the embodiments according to the present invention have been described above, the present invention may not be limited to the above-mentioned embodiments but can be variously modified. Components disclosed in the aforementioned embodiments may be combined suitably to form various modifications. For example, some of all components disclosed in the embodiments may be removed or may be appropriately combined.

Additional advantages and modifications will readily occur to those skilled in the art. Therefore, the invention in its broader aspects may not be limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
a transmission module configured to transmit signals;
a reception module configured to receive signals;
a responding module configured to respond so as to switch a communication state from a first state, in which transmission and reception of signals are halted, to a second state, in which transmission and reception of signals are routinely performed, when a plurality of commands in a specific sequence are transmitted and received by the transmission module and the reception module, respectively;
a testing module configured to execute testing of whether or not the responding module is correctly responding to the plurality of commands transmitted and received by the transmission module and the reception module, respectively,
the testing being performed via a loop-back mode transmission and reception path configured so that the reception module receives commands transmitted by the transmission module; and
a controlling module configured to control the transmission module to transmit a specific command, to control the reception module to receive the specific command via the transmission and reception path and to deactivate a response to the received specific command, and to control the transmission module to transmit an ALIGN primitive based on a reception of the specific command by the reception module subsequent to transmitting the specific command and deactivating the response to the received specific command, when the testing is executed by the testing module,
wherein the testing executed by the testing module is testing of signal transmission and reception according to a Serial ATA (SATA) OOB sequence, and
wherein the first state is either PARTIAL status or SLUMBER status, the second state is PHYRDY status, and the specific command is COMWAKE.

2. The apparatus of claim 1, further comprising:
a generation module configured to generate a command to be transmitted by the transmission module in the first state,
wherein, during the testing executed by the testing module, the transmission module is configured to transmit the command generated by the generation module, and the reception module is configured to receive the transmitted command as a lead command from the plurality of commands for switching the communication state from the first state to the second state.

3. The apparatus of claim 1, wherein, during the testing executed by the testing module, the controlling module is configured to suppose that the reception module has received a lead command from the plurality of commands for switching the communication state from the first state to the second state.

4. A communication method performed by a communication apparatus comprising:
a transmission module that transmits signals; and
a reception module that receives signals,
wherein the communication method comprises:
responding so as to switch a communication state from a first state, in which transmission and reception of signals are halted, to a second state, in which transmission and reception of signals are routinely performed, when a plurality of commands in a specific sequence are transmitted and received;
executing testing of whether or not a response to the plurality of commands transmitted and received is correct, the testing being performed via a loop-back mode transmission and reception path configured so that transmitted commands are received,
wherein the testing includes transmitting the specific command, receiving the specific command via the transmission and reception path, deactivating a response to the received specific command, and transmitting an ALIGN primitive based on receiving the specific command subsequent to transmitting the specific command and deactivating the response to the received specific command,
wherein the testing is of signal transmission and reception according to a Serial ATA (SATA) OOB sequence, and
wherein the first state is either PARTIAL status or SLUMBER status, the second state is PHYRDY status, and the specific command is COMWAKE.

5. A communication apparatus comprising:
a transmission module configured to transmit signals; and
a reception module configured to receive signals,
wherein, when executing testing of whether or not a correct response is performed in response to a plurality of commands transmitted and received in a specific sequence between the transmission module and the reception module for switching a communication state, the testing being performed via a loop-back mode transmission and reception path configured so that transmitted commands are received, the transmission module transmits a first command that is different from a command corresponding to a received specific command, the first command being transmitted in response to the receipt of the specific command during the testing, and the reception module receives the specific command via the transmission and reception path and deactivates a response to the received specific command, wherein the response to the received specific command includes transmitting the command corresponding to the received specific command.

* * * * *